United States Patent
Qu

(10) Patent No.: US 11,548,082 B2
(45) Date of Patent: Jan. 10, 2023

(54) POWERED THREADED ROD CUTTER

(71) Applicant: MILWAUKEE ELECTRIC TOOL CORPORATION, Brookfield, WI (US)

(72) Inventor: Jian Gang Qu, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/487,384

(22) Filed: Sep. 28, 2021

(65) Prior Publication Data

US 2022/0168826 A1    Jun. 2, 2022

(30) Foreign Application Priority Data

Nov. 27, 2020    (CN) .......................... 202022805925.7

(51) Int. Cl.
| | | |
|---|---|---|
| *B23D 29/00* | (2006.01) | |
| *B23D 15/12* | (2006.01) | |
| *B23D 15/04* | (2006.01) | |

(52) U.S. Cl.
CPC .......... *B23D 29/002* (2013.01); *B23D 15/04* (2013.01); *B23D 15/12* (2013.01)

(58) Field of Classification Search
CPC ...... B23D 20/002; B23D 15/04; B23D 15/12; B23D 35/001; B23D 17/04; B23D 23/00; B23D 21/00; B23D 15/14
USPC .......... 30/228, 42, 226, 233, 134, 360, 361, 30/90.2, 90.3, 180, 241; 83/605
See application file for complete search history.

(56) References Cited

U.S. PATENT DOCUMENTS

| | | |
|---|---|---|
| 1,935,297 A | 11/1933 | Newman et al. |
| 1,955,530 A | 4/1934 | Breitenstein |
| 2,513,864 A | 7/1950 | James et al. |
| 2,594,177 A | 4/1952 | Kammlade, Jr. |
| 2,717,672 A | 9/1955 | Maurer |
| 2,908,022 A | 10/1959 | Herbert |

(Continued)

FOREIGN PATENT DOCUMENTS

| | | |
|---|---|---|
| CN | 1095237 C | 11/2002 |
| CN | 201015808 Y | 2/2008 |

(Continued)

OTHER PUBLICATIONS

Dewalt, "DCS350B Rod Cutter, 1/4" to 1/2" Capacity" publicly available before Feb. 14, 2018, 1 page.

(Continued)

*Primary Examiner* — Ghassem Alie
(74) *Attorney, Agent, or Firm* — Michael Best & Friedrich LLP

(57) ABSTRACT

A powered threaded rod cutter configured to perform a cutting operation on a threaded rod includes a first cutting die and a second cutting die. At least the first cutting die includes a recess in which a first portion of the threaded rod is at least partly receivable, an electric motor, and a planetary transmission positioned downstream of the electric motor. The powered threaded rod cutter additionally includes a drivetrain for converting a rotational output of the planetary transmission to a pivoting movement of the second cutting die, and a guide against which a second portion of the threaded rod may contact to support the threaded rod to be perpendicular relative to the second cutting die prior to the cutting operation.

20 Claims, 12 Drawing Sheets

(56) References Cited

U.S. PATENT DOCUMENTS

| | | |
|---|---|---|
| 3,495,331 A | 2/1970 | Riggs |
| 3,631,596 A | 1/1972 | Glaus |
| 3,882,772 A | 5/1975 | Geisow et al. |
| 3,915,034 A | 10/1975 | Ward |
| 3,943,846 A | 3/1976 | Geisow et al. |
| 4,282,618 A | 8/1981 | Wagner |
| 4,743,146 A | 5/1988 | Khmelnitsky et al. |
| 4,769,911 A | 9/1988 | Araki |
| 4,871,033 A | 10/1989 | Odoni et al. |
| 4,890,385 A | 1/1990 | Vanderpol et al. |
| 5,080,180 A | 1/1992 | Hansson |
| 5,111,681 A | 5/1992 | Yasui et al. |
| 5,195,354 A | 3/1993 | Yasui et al. |
| 5,399,129 A | 3/1995 | Ciolli |
| 5,457,889 A | 10/1995 | Kimura |
| 5,533,415 A | 7/1996 | Ackermann et al. |
| 5,558,166 A | 9/1996 | Chen |
| 6,178,643 B1 | 1/2001 | Erbrick et al. |
| 6,230,542 B1 | 5/2001 | Frenken |
| 6,276,186 B1 | 8/2001 | Frenken |
| 6,401,515 B2 | 6/2002 | Frenken |
| 6,415,641 B1 | 7/2002 | Wagner |
| 6,431,289 B1 | 8/2002 | Potter et al. |
| 6,532,790 B2 | 3/2003 | Frenken |
| 6,662,620 B1 | 12/2003 | Baron et al. |
| 6,676,557 B2 | 1/2004 | Milbourne et al. |
| 6,718,870 B1 | 4/2004 | Frenken |
| 6,857,983 B2 | 2/2005 | Milbourne et al. |
| 6,984,188 B2 | 1/2006 | Potter et al. |
| 7,020,967 B2 | 4/2006 | Kimura |
| 7,101,300 B2 | 9/2006 | Milbourne et al. |
| 7,152,325 B2 | 12/2006 | Green et al. |
| 7,284,330 B2 | 10/2007 | Wagner |
| 7,537,064 B2 | 5/2009 | Milbourne et al. |
| 7,743,510 B2 | 6/2010 | Lazarevic |
| 7,900,714 B2 | 3/2011 | Milbourne et al. |
| 7,980,324 B2 | 7/2011 | Bixler et al. |
| 8,011,445 B2 | 9/2011 | Duesselberg et al. |
| 8,033,024 B2 | 10/2011 | Goop |
| 8,205,685 B2 | 6/2012 | Bixler et al. |
| 8,220,561 B2 | 7/2012 | Milbourne et al. |
| 8,266,991 B2 | 9/2012 | Thorson et al. |
| 8,415,922 B2 | 4/2013 | Funabashi et al. |
| 8,683,704 B2 | 4/2014 | Scott et al. |
| 8,689,449 B2 | 4/2014 | Lazarevic |
| 8,763,257 B2 | 7/2014 | Thorson et al. |
| 8,875,404 B2 | 11/2014 | Scott et al. |
| 9,242,422 B2 | 1/2016 | Schweizer et al. |
| 9,302,402 B2 | 4/2016 | Thorson et al. |
| 9,339,938 B2 | 5/2016 | Winkel et al. |
| 9,434,119 B2 | 9/2016 | Schweizer et al. |
| 9,486,865 B2 | 11/2016 | Scott et al. |
| 9,573,263 B2 | 2/2017 | Bowles et al. |
| 9,573,335 B2 | 2/2017 | Schweizer et al. |
| 9,579,785 B2 | 2/2017 | Bixler et al. |
| 9,757,868 B2 | 9/2017 | Winkel et al. |
| 10,092,966 B2 | 10/2018 | Parks et al. |
| 2002/0166237 A1* | 11/2002 | Kimura ............... B23D 29/002 30/95 |
| 2005/0115081 A1 | 6/2005 | Tu |
| 2007/0137455 A1 | 6/2007 | Watkins |
| 2008/0000091 A1 | 1/2008 | Eriguchi |
| 2008/0168667 A1 | 7/2008 | Spinato |
| 2009/0102407 A1 | 4/2009 | Klemm et al. |
| 2012/0222879 A1 | 9/2012 | Bixler et al. |
| 2013/0055575 A1 | 3/2013 | Delmas |
| 2014/0024489 A1 | 1/2014 | Heber et al. |
| 2014/0182137 A1 | 7/2014 | Liu et al. |
| 2014/0342655 A1 | 11/2014 | Boom et al. |
| 2016/0031072 A1 | 2/2016 | Lim et al. |
| 2016/0101477 A1 | 4/2016 | Parks et al. |
| 2016/0214265 A1 | 7/2016 | Thorson et al. |
| 2017/0021435 A1* | 1/2017 | Parks ................ B23D 35/001 |
| 2017/0120437 A1 | 5/2017 | Bixler et al. |
| 2017/0167585 A1 | 6/2017 | Rompel et al. |
| 2018/0021840 A1 | 1/2018 | Thorson et al. |
| 2019/0247937 A1 | 8/2019 | Gall et al. |

FOREIGN PATENT DOCUMENTS

| | | | |
|---|---|---|---|
| DE | 416989 C | 8/1925 | |
| DE | 478421 C | 6/1929 | |
| DE | 2432512 C2 | 12/1983 | |
| DE | 9421047 U1 | 7/1995 | |
| DE | 19515955 A1 | 11/1995 | |
| DE | 19809131 B4 | 4/2006 | |
| DE | 10124443 B4 | 7/2008 | |
| DE | WO 2013198774 A1 * | 12/2013 | ............. B23D 33/10 |
| DE | 102012215810 A1 | 3/2014 | |
| DE | 102013208890 A1 | 11/2014 | |
| EP | 0881022 A1 | 12/1998 | |
| EP | 1579939 A1 | 9/2005 | |
| EP | 1618979 A1 | 1/2006 | |
| EP | 1634667 A1 | 3/2006 | |
| EP | 1800781 A2 | 6/2007 | |
| EP | 3222379 A1 | 9/2017 | |
| GB | 1306818 A | 2/1973 | |
| WO | 2008046973 A1 | 4/2008 | |
| WO | 2012033540 A2 | 3/2012 | |

OTHER PUBLICATIONS

Hitatchi, "CL18DSL, 18V Cordless Stud Cutter" publicly available before Feb. 14, 2018, 1 page.

Klauke, "ESG 25 Battery Powered Hydraulic Cutting Tool 25 mm dia." publicly available before Feb. 14, 2018, 1 page.

Makita, "Rechargeable All Screw Cutter Model SC101D Instruction Manual" publicly available before Feb. 14, 2018, 33 pages including statement of relevance.

* cited by examiner

POWERED THREADED ROD CUTTER

FIELD OF THE INVENTION

The present invention relates to power tools, and more particularly to powered threaded rod cutters.

BACKGROUND OF THE INVENTION

Powered threaded rod cutters are used to cut threaded rods. During operation, a rod may be positioned at an angle relative to cutting dies of the cutter, thereby resulting in a slanted cut of the rod. During such instances, various components of the cutter, such as the cutting dies, may be jammed or damaged.

SUMMARY OF THE INVENTION

The present invention provides, in one aspect, a powered threaded rod cutter configured to perform a cutting operation on a threaded rod, including a first cutting die and a second cutting die, at least the first cutting die including a recess in which a first portion of the threaded rod is at least partly receivable, an electric motor, a planetary transmission positioned downstream of the electric motor, a drivetrain for converting a rotational output of the planetary transmission to a pivoting movement of the second cutting die, and a guide against which a second portion of the threaded rod may contact to support the threaded rod to be perpendicular relative to the second cutting die prior to the cutting operation.

Optionally, the guide is pivotable in unison with the second cutting die.

Optionally, the guide disengages the threaded rod prior to the second cutting die contacting the threaded rod.

Optionally, the drivetrain includes an arm pivotably coupled to the planetary transmission, and a shaft extending through the arm and defining a pivot axis. The arm is configured to pivot about the pivot axis.

Optionally, the arm includes a roller, and a mount coupled to the second cutting die.

Optionally, the drivetrain further includes a bracket coupled to the arm.

Optionally, the guide is coupled to the bracket. The guide is pivotable in unison with the bracket and the arm about the pivot axis.

Optionally, the guide includes a hub portion mounted to the shaft and a lobe portion radially extending from the hub portion. The second portion of the threaded rod is engageable with the lobe portion of the guide.

Optionally, the lobe portion of the guide includes a planar edge that is tangent to the recess in the first cutting die prior to the cutting operation. The second portion of the threaded rod is engageable with the planar edge prior to the cutting operation.

The present invention provides, in another aspect, a powered threaded rod cutter configured to perform a cutting operation on a threaded rod, including a first cutting die including a recess in which a first portion of the threaded rod is at least partly receivable, a second cutting die movable relative to the first cutting die, an electric motor, a planetary transmission positioned downstream of the electric motor, a drivetrain for converting a rotational output of the planetary transmission to a pivoting movement of the second cutting die, wherein the drivetrain includes an arm coupled to the second cutting die, and a shaft extending through the arm and defining a pivot axis, wherein the arm is configured to pivot about the pivot axis, and a guide coupled to the arm and configured to engage a second portion of the threaded rod to support the threaded rod to be perpendicular relative to the second cutting die prior to the cutting operation, wherein the guide is pivotable in unison with the arm and the second cutting die about the pivot axis.

Optionally, the powered threaded rod cutter further comprises a cam configured to receive torque from the planetary transmission when the electric motor is activated, wherein the arm is pivoted in response to being driven by the cam, and a roller in contact with the cam.

Optionally, the cam is rotatable from an initial position in a first direction. In response, the roller moves away from an axis of the cam, thereby causing the arm and the guide to pivot about the pivot axis in the first direction, and the second cutting die to pivot toward the first cutting die, closing a gap between the first cutting die and the second cutting die.

Optionally, in response to the arm and the guide pivoting about the pivot axis in the first direction, the guide disengages the threaded rod.

Optionally, in response to the cam continuing to rotate, the roller disengages a surface of the cam, thereby causing the arm and the guide to pivot in a second direction, reopening the gap between the first cutting die and the second cutting die.

Optionally, in response to the cam reaching the initial position, the electric motor is deactivated.

Optionally, the drivetrain further includes a bracket coupled to the arm.

Optionally, the guide is coupled to the bracket. The guide is pivotable in unison with the bracket and the arm about the pivot axis.

Optionally, the guide includes a hub portion mounted to the shaft and a lobe portion radially extending from the hub portion. The second portion of the threaded rod is engageable with the lobe portion of the guide.

Optionally, the lobe portion of the guide includes a planar edge that is tangent to the recess in the first cutting die prior to the cutting operation. The second portion of the threaded rod is engageable with the planar edge prior to the cutting operation.

The present invention provides, in yet another aspect, a powered threaded rod cutter configured to perform a cutting operation on a threaded rod, including a first cutting die including a recess in which a first portion of the threaded rod is at least partly receivable, a second cutting die movable relative to the first cutting die, an electric motor, a planetary transmission positioned downstream of the electric motor, a drivetrain for converting a rotational output of the planetary transmission to a pivoting movement of the second cutting die, wherein the drivetrain includes an arm coupled to the second cutting die, a shaft extending through the arm and defining a pivot axis, wherein the arm is configured to pivot about the pivot axis, and a guide coupled to the arm and including a hub portion mounted to the shaft and a lobe portion radially extending from the hub portion, wherein the lobe portion of the guide includes a planar edge that is tangent to the recess in the first cutting die prior to the cutting operation, and wherein a second portion of the threaded rod is engageable with the planar edge to support the threaded rod to be perpendicular relative to the second cutting die prior to the cutting operation.

Other features and aspects of the invention will become apparent by consideration of the following detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example only, with reference to the accompanying drawings in which.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
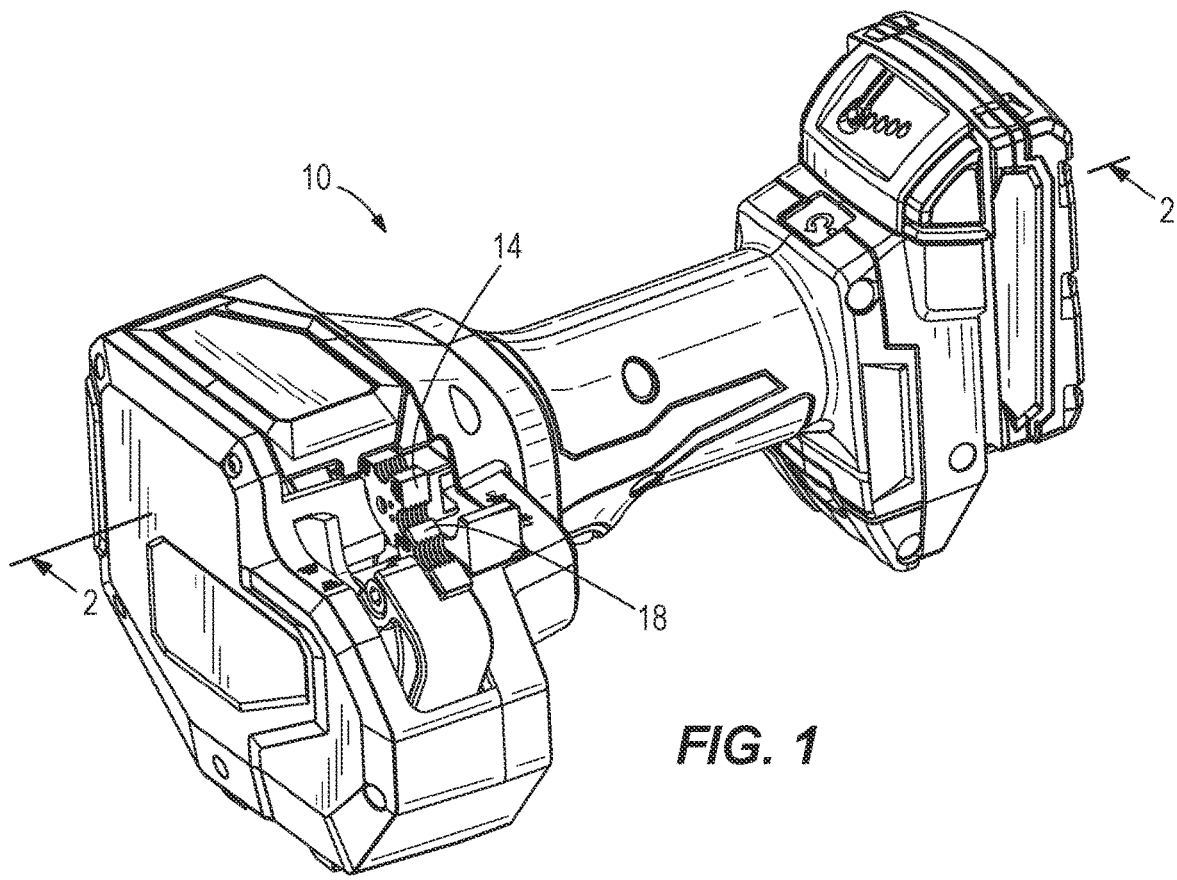
FIG. 1 is a perspective view of a powered threaded rod cutter in accordance with an embodiment of the invention.

With reference to FIG. 1, a powered threaded rod cutter 10 includes a stationary die 14 and a movable die 18 located on the side of the cutter 10. Each of the dies 14, 18 includes four orthogonal faces, each having a threaded recess 20 defined therein. The recesses 20 are sized to accommodate threaded rods of different nominal outer diameters, with the dies 14, 18 being repositionable to four different orientations to accommodate four different sizes of threaded rod.

Figure 2:
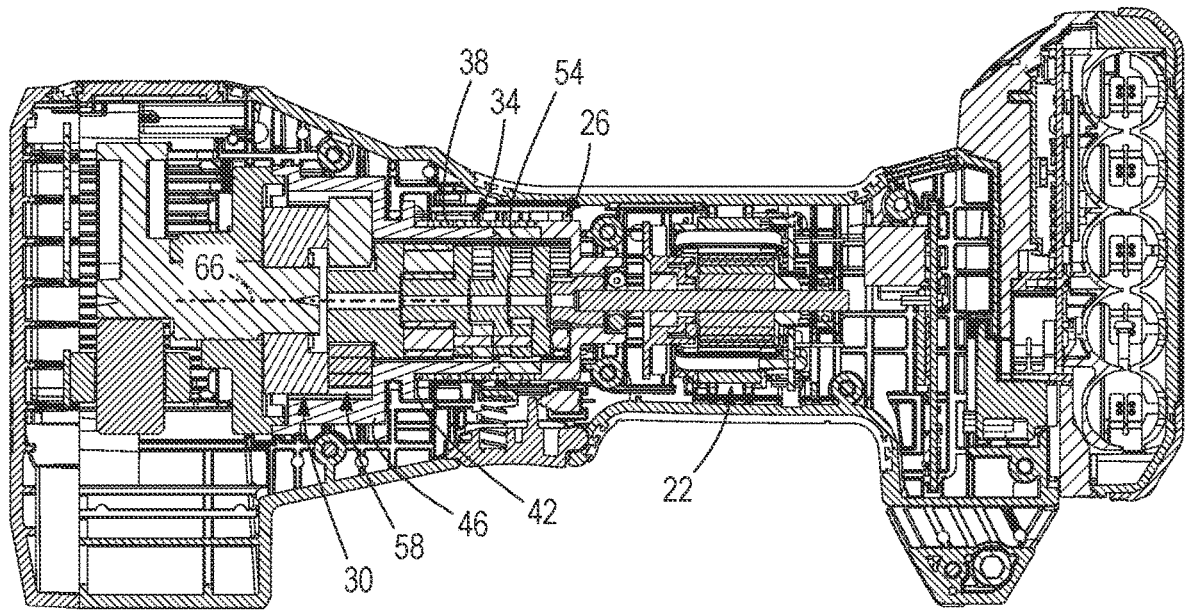
FIG. 2 is a cross-sectional view of the powered threaded rod cutter of FIG. 1 taken along line 2-2 of FIG. 1.

The cutter 10 includes an electric motor 22 (FIG. 2), a multi-stage planetary transmission 26 downstream of the motor 22, and a drivetrain 30 for converting the rotational output of the transmission 26 to a pivoting movement of the movable die 18 during a rod-cutting operation (FIG. 2). To prevent damage to the motor 22, transmission 26, and drivetrain 30 should the movable die 18 become seized during a rod-cutting operation, the cutter 10 includes a clutch mechanism 34 that redirects torque from the motor 22 away from the drivetrain 30 in response to a predetermined torque threshold being reached.

Figure 3:
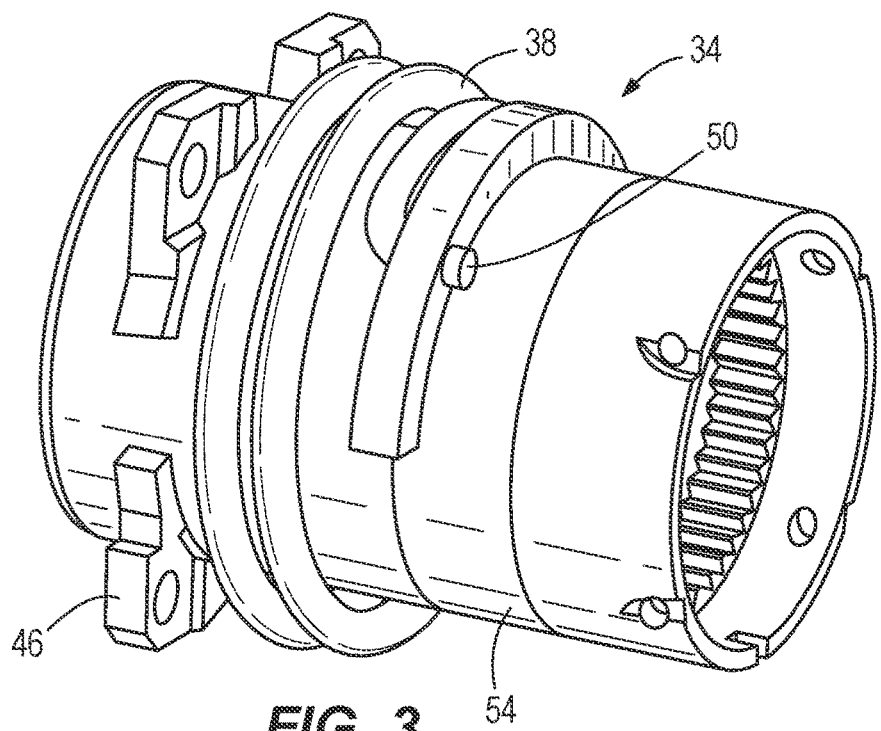
FIG. 3 is a perspective view of a clutch mechanism of the powered threaded rod cutter of FIG. 1.
Figure 4:
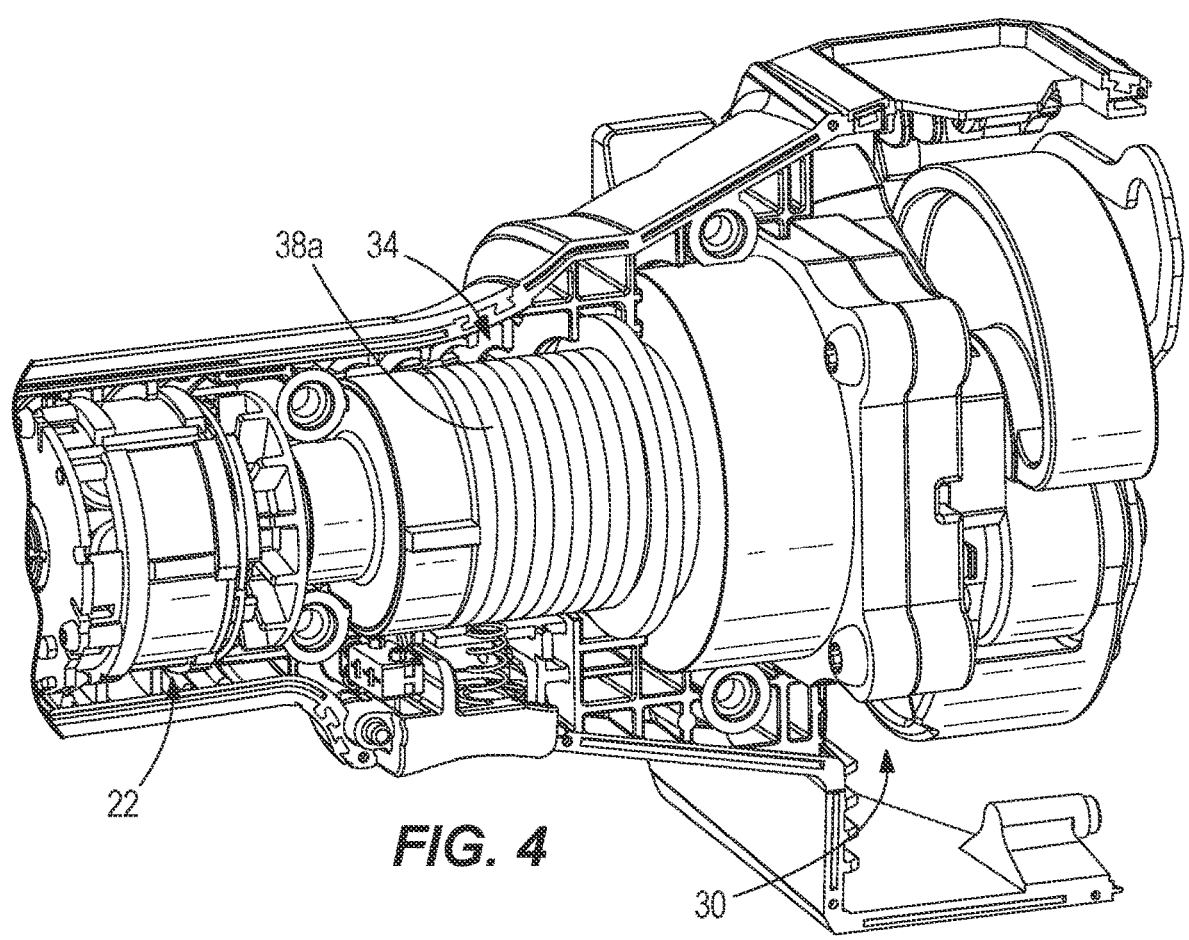
FIG. 4 is a cutaway perspective view of the powered threaded rod cutter of FIG. 1.
Figure 5:
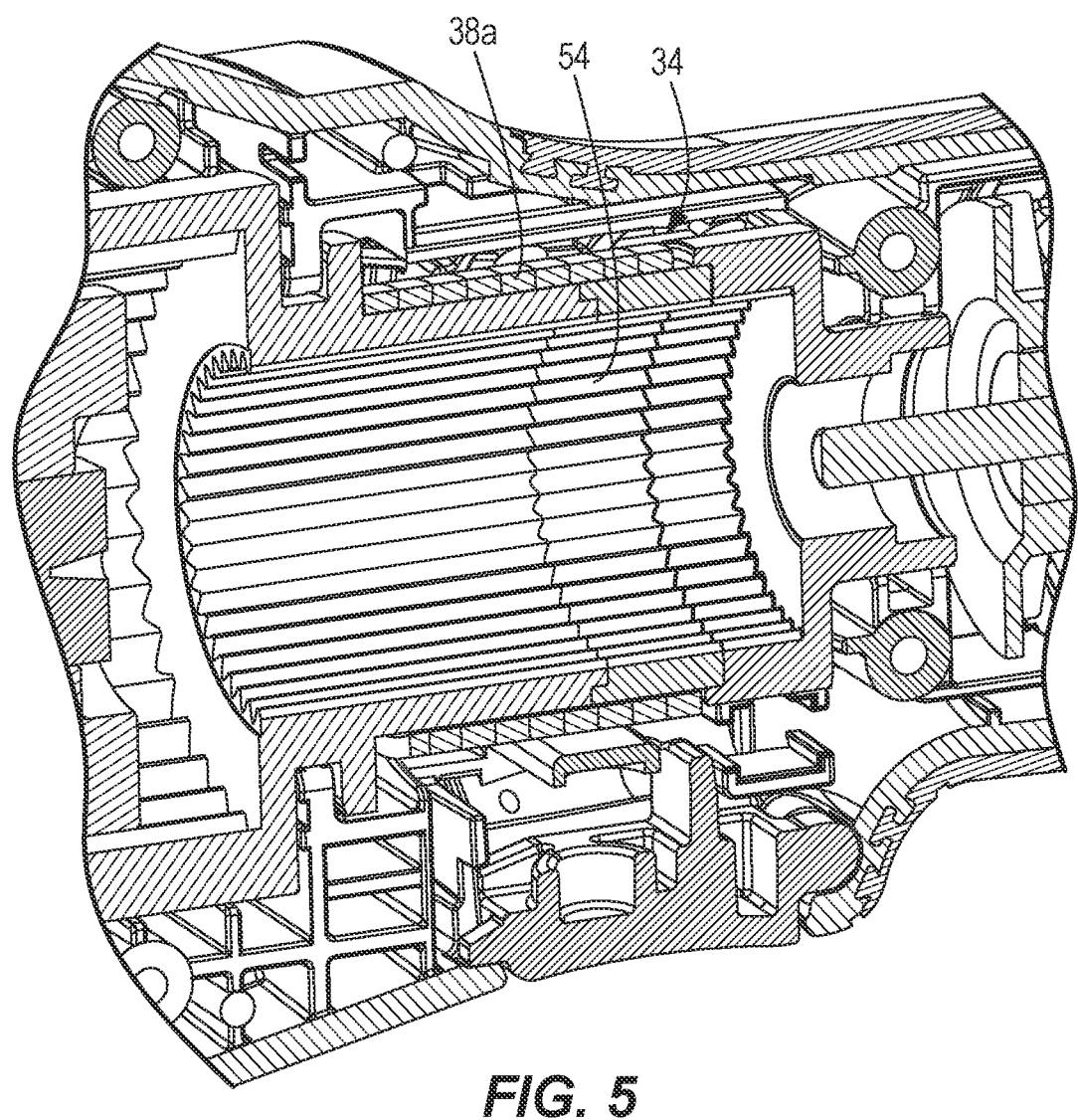
FIG. 5 is a cutaway perspective view of the powered threaded rod cutter of FIG. 1, with portions removed.

The clutch mechanism 34 includes a spring (e.g., a torsion spring 38) having one end 42 secured to a transmission housing 46 and an opposite end 50 secured to the second-stage ring gear 54 of the transmission 26, which is also a component of the clutch mechanism 34 (FIG. 3). As such, the torsion spring 38 rotationally affixes the ring gear 54 relative to the transmission housing 46 below the predetermined torque threshold. When the reaction torque through the drivetrain 30 exceeds the predetermined torque threshold in response to the movable die 18 seizing during a rod-cutting operation, torque from the motor 22 is redirected within the transmission 26 to the second stage ring gear 54, causing it to rotate relative to the transmission housing 46 against the bias of the torsion spring 38. As such, no further torque is applied to the drivetrain 30 or the movable die 18, preventing any subsequent damage. The onboard electronics of the cutter 10 detect that the predetermined torque threshold has been exceeded, and in response deactivates the motor 22. As such, the clutch mechanism 34 does not rely on the onboard electronics of the cutter 10 to protect the drivetrain 30 or moveable die 18 from damage. Alternatively, as shown in FIGS. 4 and 5, the spring may be configured as a square wire wrap spring 38a.

Figure 7:
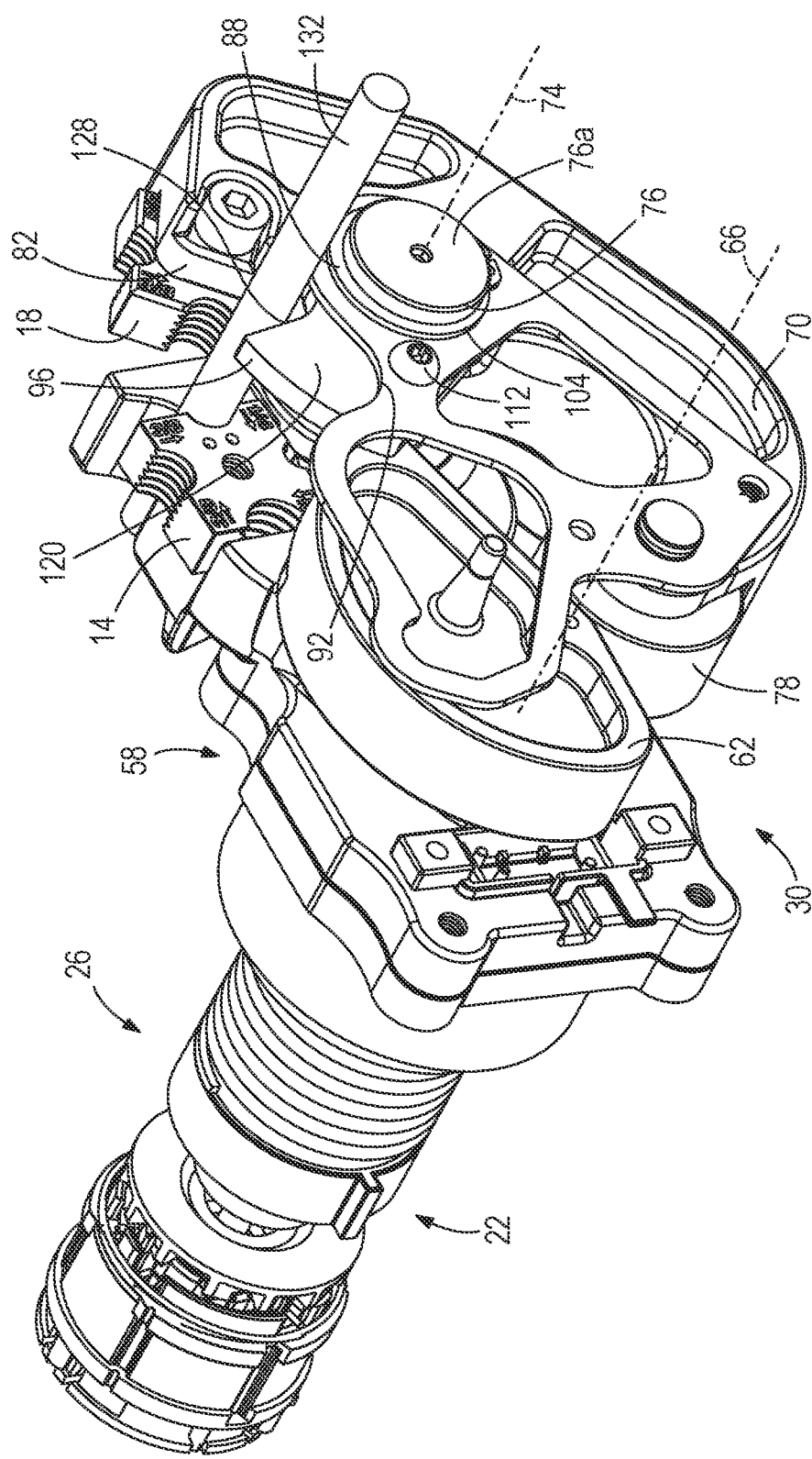
FIG. 7 is a perspective view of a transmission and drivetrain of the powered threaded rod cutter of FIG. 1.

As shown in FIGS. 2 and 7, the drivetrain 30 includes an additional planetary transmission stage 58, the output of which rotates a cam lobe 62 about a rotational axis 66. The cutter 10 also includes a follower arm 70 pivotably coupled to the transmission housing 46 about a pivot axis 74. Specifically, the follower arm 70 includes an aperture sized to receive a shaft, or pin, 76. The shaft 76 extends through the aperture and defines the pivot axis 74, which is parallel with the rotational axis 66 of the cam lobe 62 (FIGS. 2 and 8A-8E). The follower arm 70 includes, on one side of the pivot axis 74, a roller 78 in contact with the cam lobe 62 and, on an opposite side of the pivot axis 74, a mount 82 to which the movable die 18 is fastened (FIG. 7).

A bracket 80 is positioned on the shaft 76 and is coupled to the follower arm 70 via a fastener 84. More specifically, the bracket 80 includes an aperture 88 shaped and sized to receive the shaft 76, such that the bracket 80 is pivotable with the follower arm 70 about the pivot axis 74 relative to the shaft 76. The bracket 80 further includes a curved notch 92. An alignment guide 96 is positioned on the shaft 76 between the bracket 80 and an edge 100 of the follower arm 70. A first retaining ring 104 is seated on the shaft 76 between the bracket 80 and a distal end 76a of the shaft 76, and a second retaining ring 108 is seated on the shaft 76 between the edge 100 of the follower arm 70 and the alignment guide 96, thus axially affixing the alignment guide 96 to the shaft 76 (FIG. 9).

Figure 6:
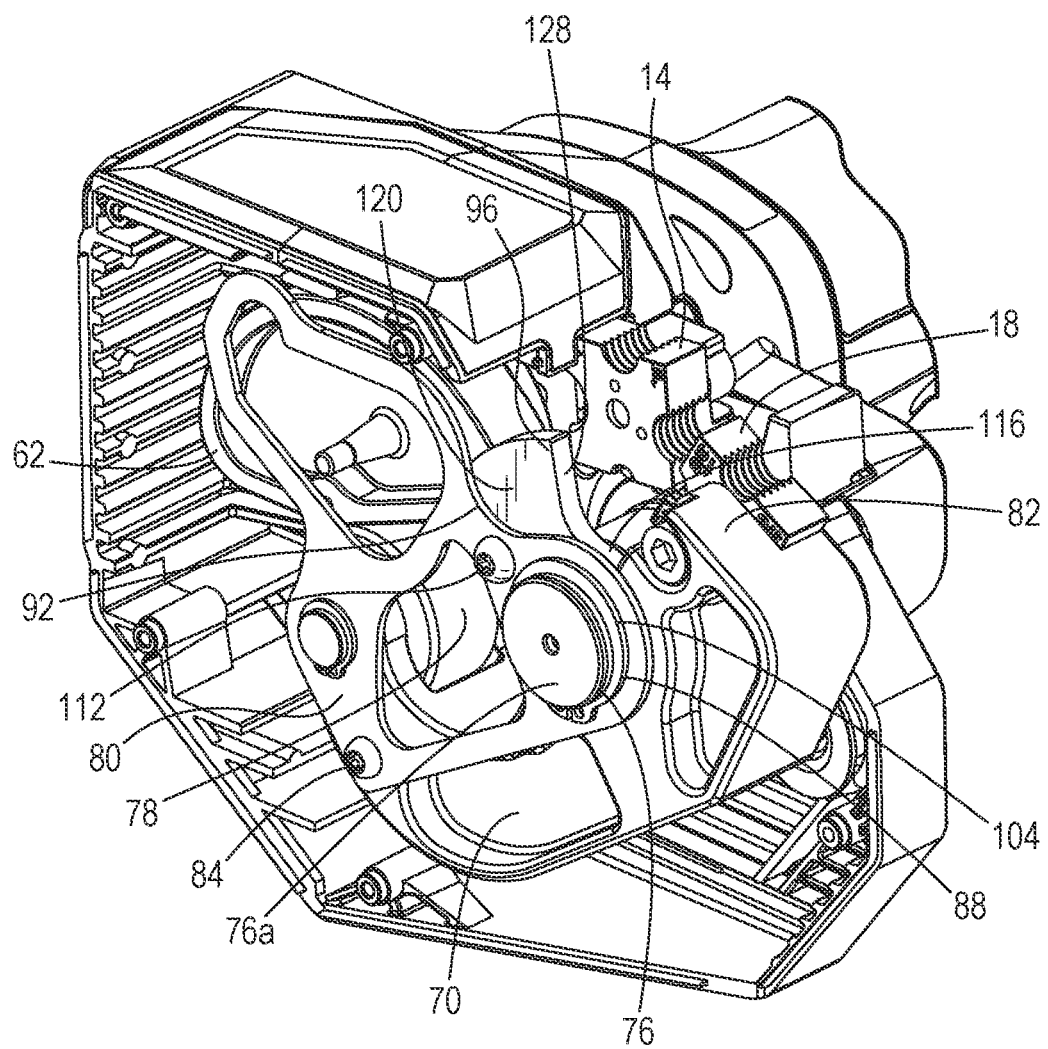
FIG. 6 is a perspective cutaway view of the powered threaded rod cutter of FIG. 1.
Figure 8A:
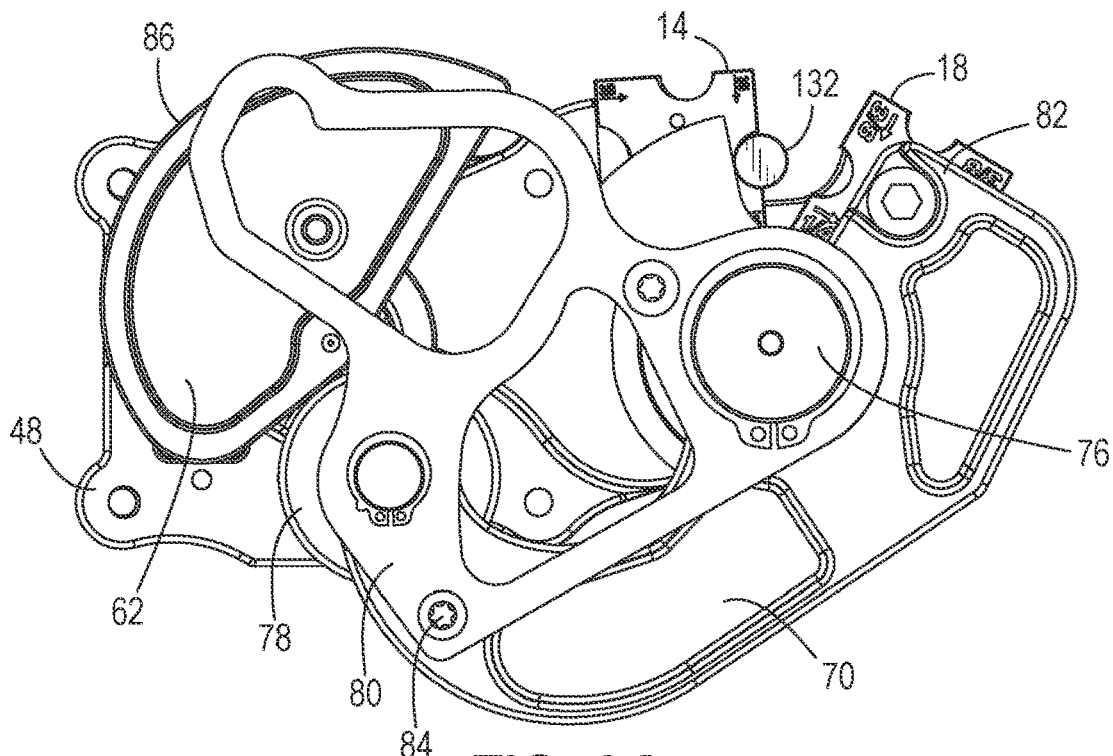
FIG. 8A is a cross-sectional view of the drivetrain during operation of the powered threaded rod cutter of FIG. 1, illustrating the drivetrain in a first position.
Figure 8B:
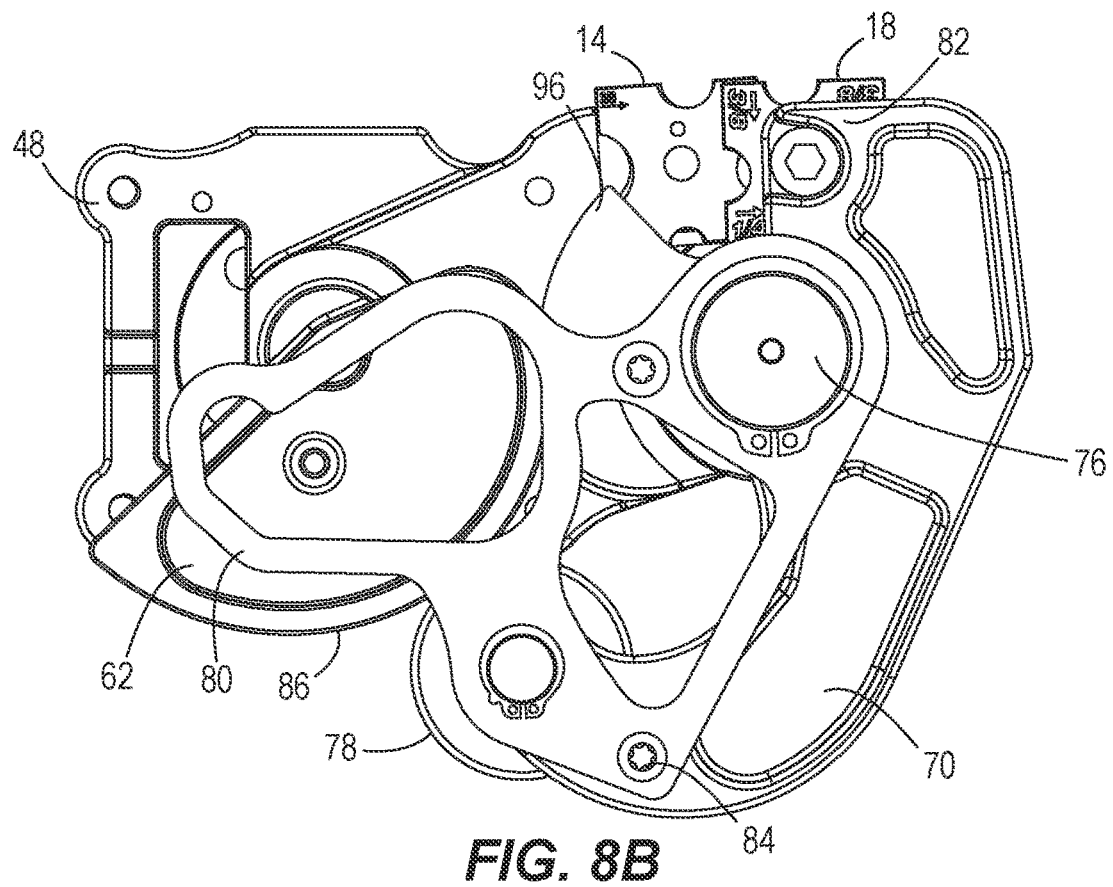
FIG. 8B is a cross-sectional view of the drivetrain during operation of the powered threaded rod cutter of FIG. 1, illustrating the drivetrain in a second position.
Figure 9:
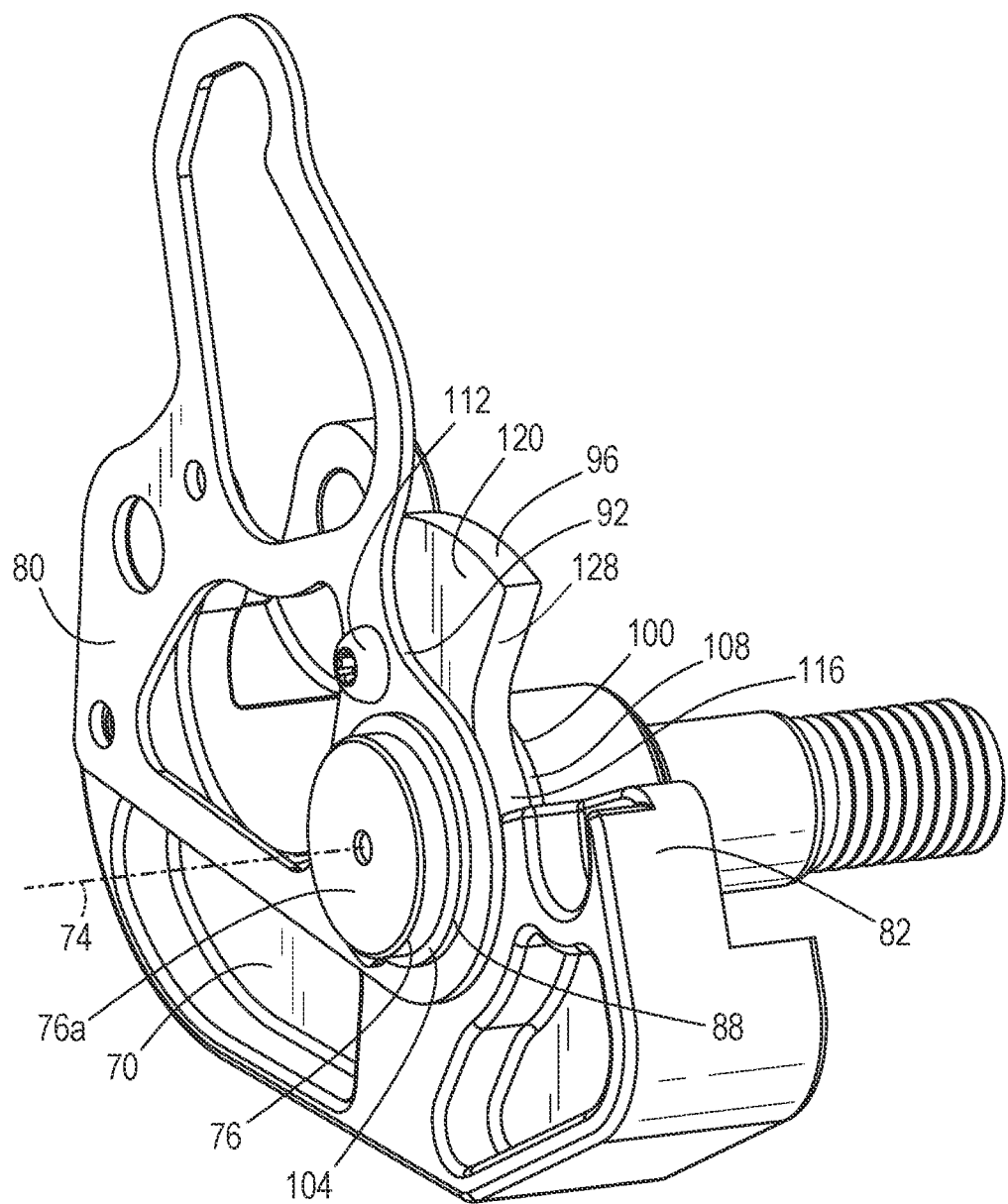
FIG. 9 is a perspective view of a portion of drivetrain, illustrating a guide coupled to cutting dies of the powered threaded rod cutter of FIG. 1.

The alignment guide 96 is coupled to the bracket 80 via a fastener 112 (FIGS. 6, 7, and 9). The alignment guide 96 is pivotable in unison with the bracket 80, and therefore the follower arm 70, about the pivot axis 74 relative to the shaft 76. With reference to FIGS. 6 and 9, the alignment guide 96 includes a hub portion 116 and a radially extending lobe portion 120. The hub portion 116 includes an aperture shaped and sized to receive the shaft 76. The lobe portion 120 includes a planar edge 128 that is tangent with one of the recesses 20 in the stationary die 14, and therefore tangent with the outer periphery of a threaded rod 132 (FIGS. 7 and 8A). As such, when the user positions the rod 132 in the cutter 10, a first portion of the rod 132 is supported within the recess 20 in the stationary die 14 and a second portion of the rod 132 is supported against the planar edge 128 of the alignment guide 96, which ensures that the rod 132 is oriented perpendicular to the respective cutting edges of the dies 14, 18.

Figure 8C:
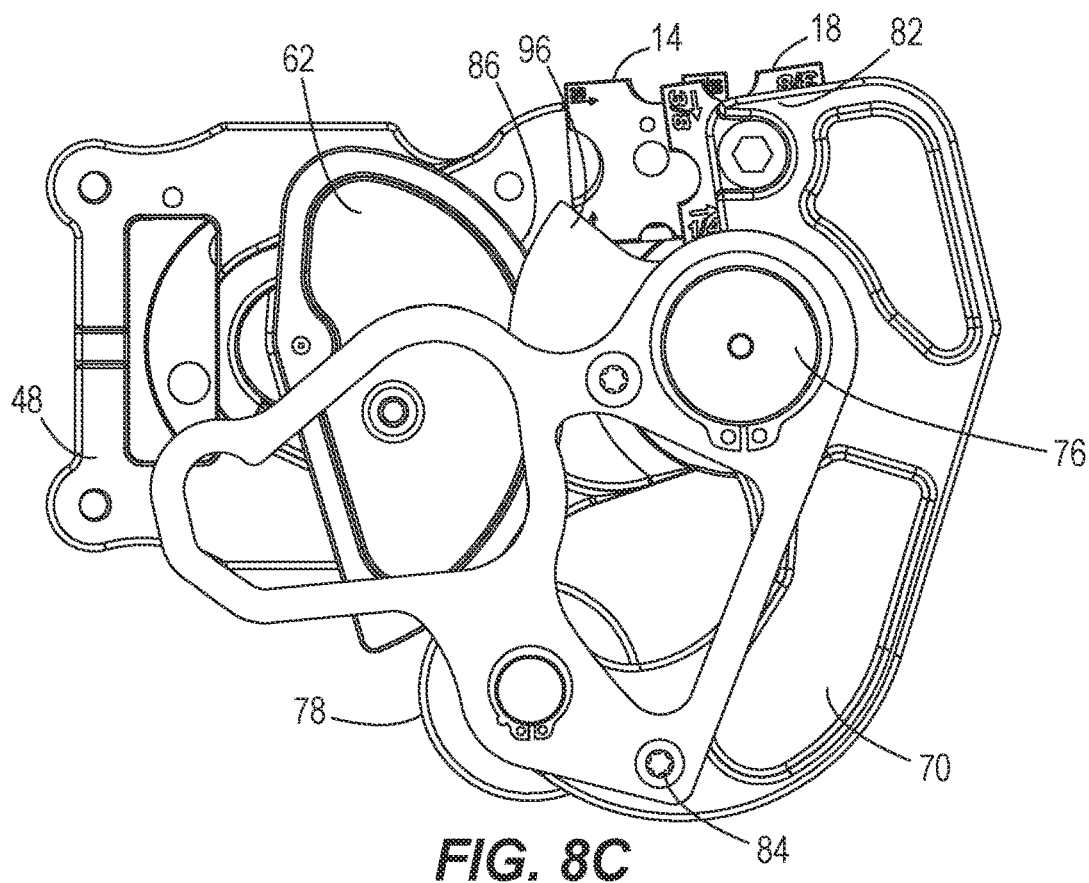
FIG. 8C is a cross-sectional view of the drivetrain during operation of the powered threaded rod cutter of FIG. 1, illustrating the drivetrain in a third position.
Figure 8D:
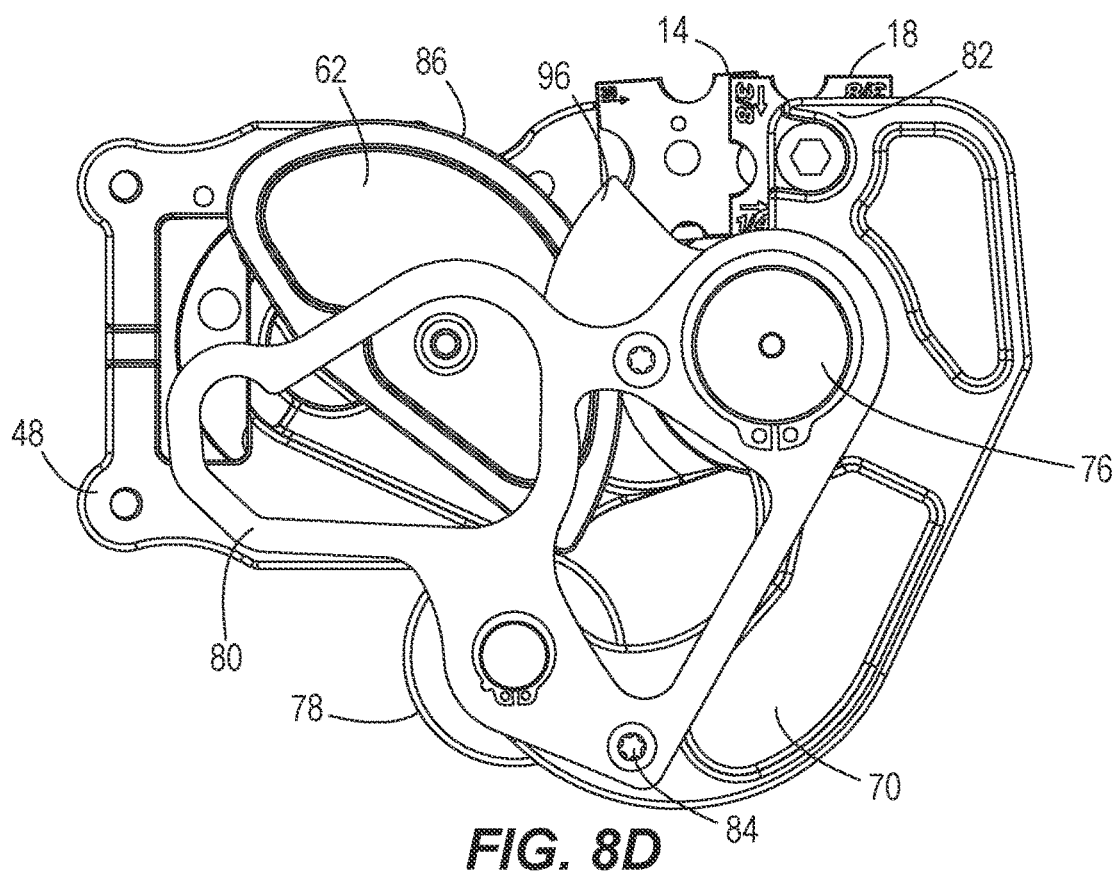
FIG. 8D is a cross-sectional view of the drivetrain during operation of the powered threaded rod cutter of FIG. 1, illustrating the drivetrain in a fourth position.
Figure 8E:
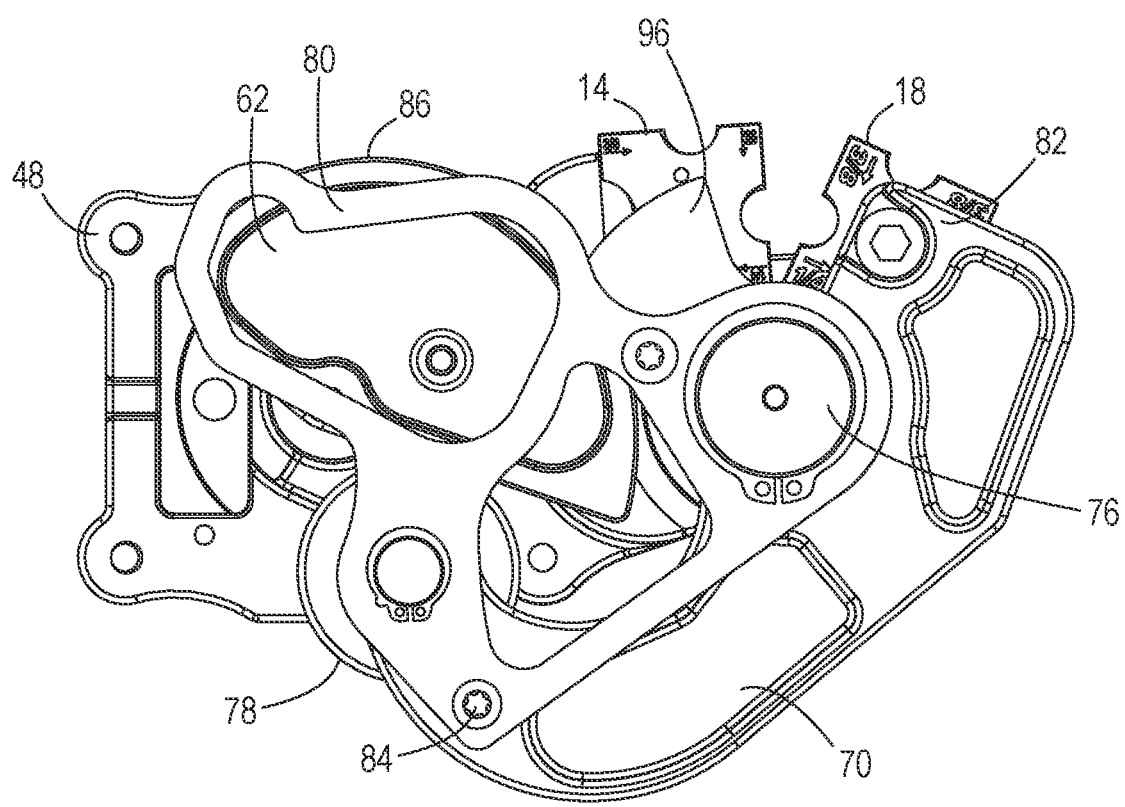
FIG. 8E is a cross-sectional view of the drivetrain during operation of the powered threaded rod cutter of FIG. 1, illustrating the drivetrain in a fifth position.

The user positions the rod 132 between the stationary die 14 and the movable die 18 prior to a rod cutting operation. The alignment guide 96 guides the rod 132 such that it rests against the planar edge 128 of the alignment guide 96 and within the recess 20 in the stationary die 14, preventing the rod 132 from being misaligned relative to the dies 14, 18, which may otherwise result in a slanted cut. When the user pulls the trigger of the cutter 10, the movable die 18 is moved toward the stationary die 14. Just prior to the movable die 18 coming into contact with the rod 132, the alignment guide 96 pivots with the bracket 80 and the follower arm 70 in a direction away from the stationary die 14. After the cut is completed (coinciding with release of the trigger), the movable die 18 cycles away from the stationary die 14 to a home position, at which time the motor 22 automatically stops. As the movable die 18 cycles away from the stationary die 14, the alignment guide 96 pivots with the bracket 80 and the follower arm 70, in a direction toward the stationary die 14. Specifically, in the sequence shown in FIGS. 8A and 8B, the cam lobe 62 is rotated about its axis 66 in a counter-clockwise direction, displacing the roller 78 away from the axis 66 and causing the follower arm 70, and therefore the alignment guide 96, to pivot about its axis 74 in a counter-clockwise direction, thus closing the gap between the dies 14, 18 to perform the rod-cutting operation (FIG. 8C). At such point, the alignment guide 96 is spaced apart from the stationary die 14. At FIG. 8D, the roller 78 disengages a driving surface 86 of the cam lobe 62, permitting a torsion spring (not shown) acting on the follower arm 70 to rebound and pivot the follower arm 70 in a clockwise direction, thus reopening the gap between the dies 14, 18 (sequence shown in FIGS. 8D to 8E) and pivoting the alignment guide 96 toward the stationary die 14. The cam lobe 62 continues to rotate in a counter-clockwise direction and is returned to the position shown in FIG. 8A, after which the motor 22 is deactivated to complete one cycle of a rod-cutting operation. At such point, the alignment guide 96 is positioned adjacent to the stationary die 14, with the planar edge 128 located tangent with the recess 20 in the stationary die 14.

Figure 10:
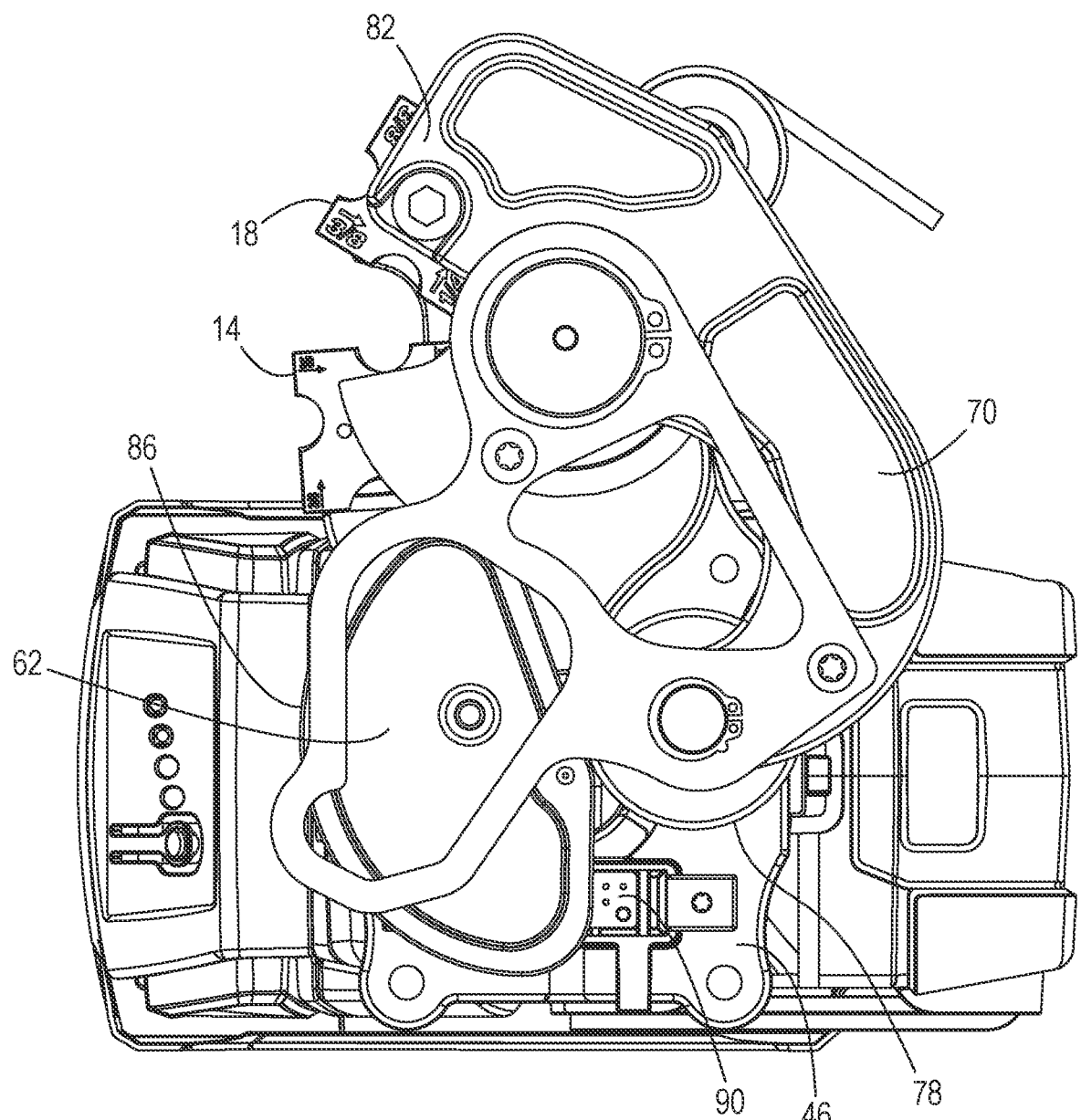
FIG. 10 is a cross-sectional view of the drivetrain, illustrating a Hall-effect sensor for detecting the position of the drivetrain.
Figure 11:
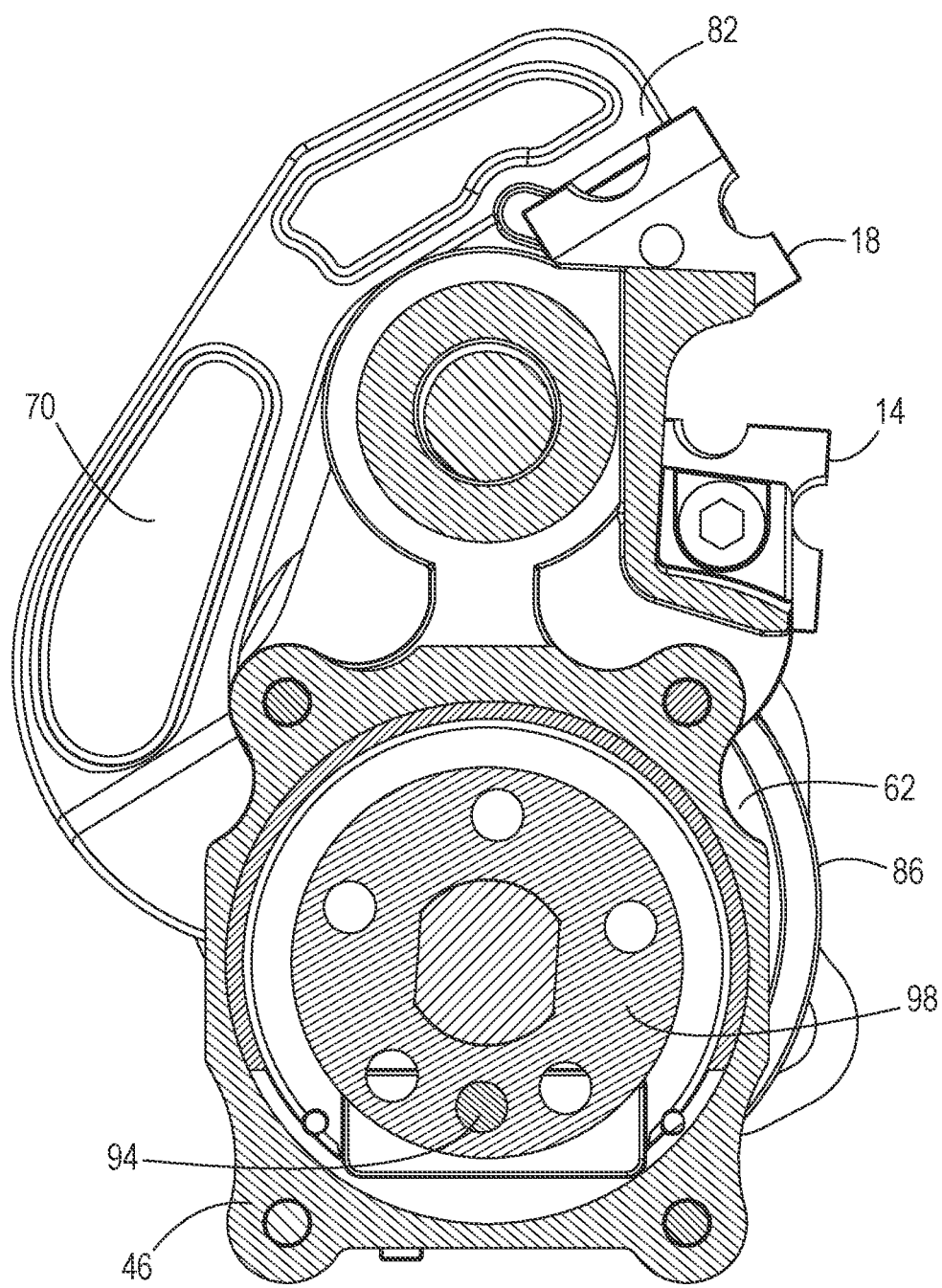
FIG. 11 is a cross-sectional view of the drivetrain, illustrating a magnet that interfaces with the Hall-effect sensor of FIG. 10.
Figure 12:
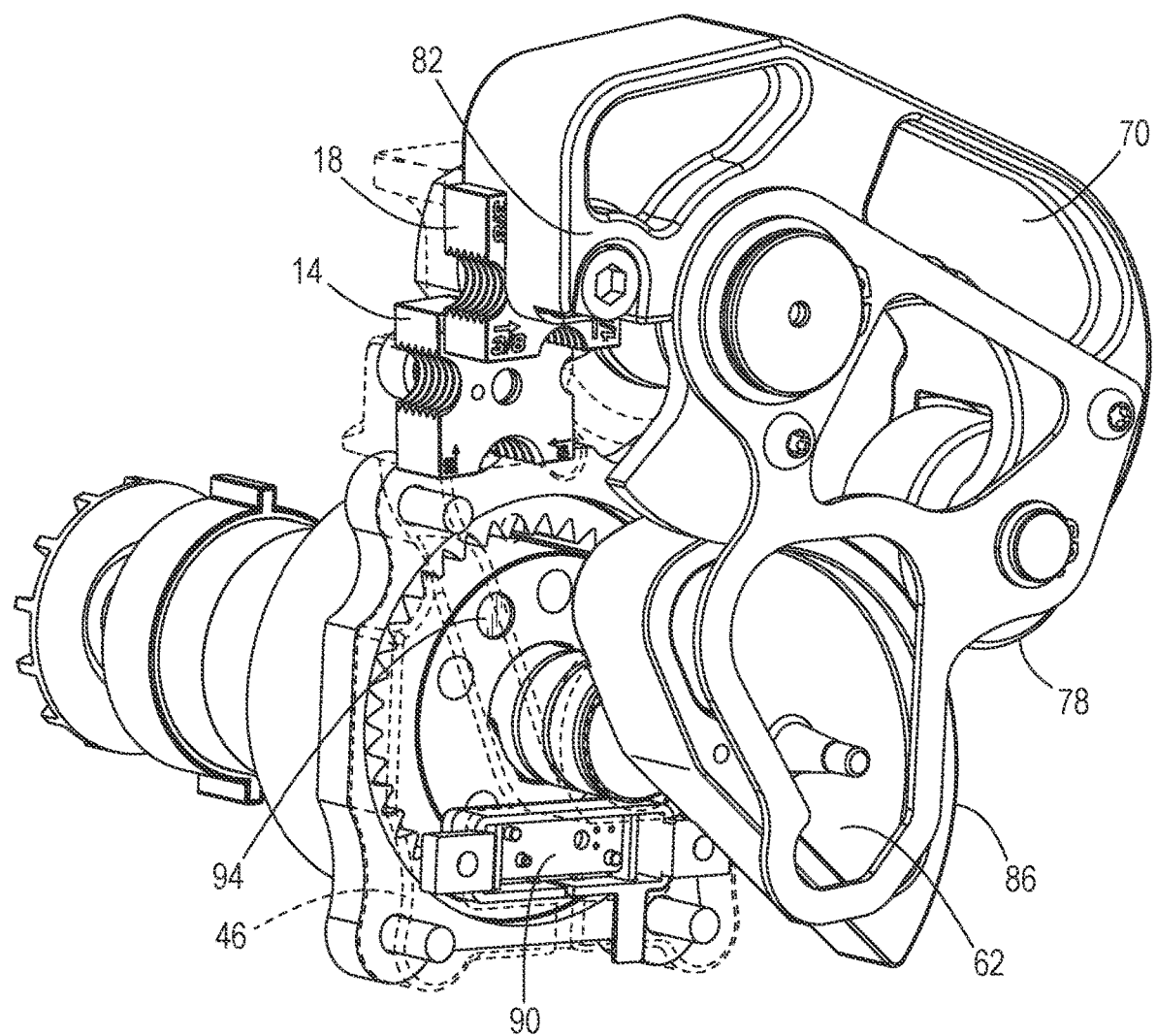
FIG. 12 is a perspective view of the drivetrain about one-half way through a drive cycle, illustrating the location of the magnet relative to the Hall-effect sensor.

FIGS. 10 and 12 illustrate a Hall-effect sensor 90 mounted to the transmission housing 46 for detecting the position of the drivetrain 30 coinciding with completion of one cycle of a rod-cutting operation. In the illustrated embodiment of the cutter 10, a magnet 94 is attached to a rotational member 98 of the transmission 26 (e.g., a final stage planet carrier; FIG. 11). Alternatively, the magnet 94 may be positioned directly on the cam lobe 62, the follower arm 70, or another component of the drivetrain 30. The Hall-effect sensor 90 detects the magnet 94 when the rotational member 98 (with the attached magnet 94) reaches a position that corresponds to the moveable die 18 reaching the home position shown in FIG. 8E. In response to detecting the magnet 94, the Hall-effect sensor 90 sends a signal to a controller (not shown), which would then deactivate the motor 22 as mentioned above coinciding with completion of one cycle of a rod-cutting operation, stopping the movable die 18 in the home position shown in FIG. 8E, and readying the cutter 10 for the next rod-cutting operation. Alternatively, should the current drawn by the motor 22 exceed a predetermined threshold during a rod-cutting operation (possibly coinciding with seizure of the movable die 18), the controller may reverse the rotational direction of the motor 22 to return the movable die 18 to the home position shown in FIG. 8E. The rotational position of the cam lobe 62 is detected by the Hall-effect sensor 90 as described above. Upon the cam lobe 62 reaching the position shown in FIG. 8E, the controller deactivates the motor 22, readying the cutter 10 for a subsequent rod-cutting operation.

Various features of the invention are set forth in the claims.

The invention claimed is:

1. A powered threaded rod cutter configured to perform a cutting operation on a threaded rod, the powered threaded rod cutter comprising:
    a first cutting die and a second cutting die, at least the first cutting die including a recess in which a first portion of the threaded rod is at least partly receivable;
    an arm, wherein the second cutting die is mounted on the arm;
    an electric motor;
    a planetary transmission positioned downstream of the electric motor;
    a drivetrain for converting a rotational output of the planetary transmission to a pivoting movement of the second cutting die; and
    a guide mounted on the arm and spaced apart from the second cutting die, wherein the guide supports a second portion of the threaded rod prior to the cutting operation to orient the threaded rod perpendicular to the first cutting die and the second cutting die, wherein the arm rotates and the guide moves away from the second portion of the threaded rod as the cutting operation begins.

2. The powered threaded rod cutter of claim 1, wherein the guide is pivotable in unison with the second cutting die.

3. The powered threaded rod cutter of claim 2, wherein the arm includes a pivot axis, a roller on one side of the pivot axis and a mount to which the movable die is fastened on an opposite side of the pivot axis.

4. The powered threaded rod cutter of claim 1, wherein the drivetrain includes an arm pivotably coupled to the planetary transmission, and a shaft extending through the arm and defining a pivot axis, and wherein the arm is configured to pivot about the pivot axis.

5. The powered threaded rod cutter of claim 4, wherein the arm includes a roller, and a mount coupled to the second cutting die.

6. The powered threaded rod cutter of claim 4, wherein the drivetrain further includes a bracket coupled to the arm.

7. The powered threaded rod cutter of claim 6, wherein the guide is coupled to the bracket, and wherein the guide is pivotable in unison with the bracket and the arm about the pivot axis.

8. The powered threaded rod cutter of claim 4, wherein the guide includes a hub portion mounted to the shaft and a lobe portion radially extending from the hub portion, and wherein the second portion of the threaded rod is engageable with the lobe portion of the guide.

9. The powered threaded rod cutter of claim 8, wherein the lobe portion of the guide includes a planar edge that is tangent to the recess in the first cutting die prior to the cutting operation, and wherein the second portion of the threaded rod is engageable with the planar edge prior to the cutting operation.

10. A powered threaded rod cutter configured to perform a cutting operation on a threaded rod, the powered threaded rod cutter comprising:
   a first cutting die including a recess in which a first portion of the threaded rod is at least partly receivable;
   a second cutting die movable relative to the first cutting die;
   an electric motor;
   a planetary transmission positioned downstream of the electric motor;
   a drivetrain for converting a rotational output of the planetary transmission to a pivoting movement of the second cutting die, wherein the drivetrain includes an arm coupled to the second cutting die, and
   a shaft extending through the arm and defining a pivot axis, wherein the arm is configured to pivot about the pivot axis; and
   a guide coupled to the arm and configured to engage a second portion of the threaded rod to support the threaded rod to be perpendicular relative to the second cutting die prior to the cutting operation, wherein the guide is pivotable in unison with the arm and the second cutting die about the pivot axis and the guide moves away from the second portion of the threaded rod as the cutting operation begins.

11. The powered threaded rod cutter of claim 10, further comprising:
   a cam configured to receive torque from the planetary transmission when the electric motor is activated, wherein the arm is pivoted in response to being driven by the cam; and
   a roller in contact with the cam.

12. The powered threaded rod cutter of claim 11, wherein the cam is rotatable from an initial position in a first direction, wherein, in response, the roller moves away from an axis of the cam, thereby causing the arm and the guide to pivot about the pivot axis in the first direction, and the second cutting die to pivot toward the first cutting die, closing a gap between the first cutting die and the second cutting die.

13. The powered threaded rod cutter of claim 12, wherein in response to the arm and the guide pivoting about the pivot axis in the first direction, the guide disengages the threaded rod.

14. The powered threaded rod cutter of claim 12, wherein in response to the cam continuing to rotate, the roller disengages a surface of the cam, thereby causing the arm and the guide to pivot in a second direction, reopening the gap between the first cutting die and the second cutting die.

15. The powered threaded rod cutter of claim 14, wherein in response to the cam reaching the initial position, the electric motor is deactivated.

16. The powered threaded rod cutter of claim 10, wherein the drivetrain further includes a bracket coupled to the arm.

17. The powered threaded rod cutter of claim 16, wherein the guide is coupled to the bracket, and wherein the guide is pivotable in unison with the bracket and the arm about the pivot axis.

18. The powered threaded rod cutter of claim 10, wherein the guide includes a hub portion mounted to the shaft and a lobe portion radially extending from the hub portion, and wherein the second portion of the threaded rod is engageable with the lobe portion of the guide.

19. The powered threaded rod cutter of claim 18, wherein the lobe portion of the guide includes a planar edge that is tangent to the recess in the first cutting die prior to the cutting operation, and wherein the second portion of the threaded rod is engageable with the planar edge prior to the cutting operation.

20. A powered threaded rod cutter configured to perform a cutting operation on a threaded rod, the powered threaded rod cutter comprising:
   a first cutting die including a recess in which a first portion of the threaded rod is at least partly receivable;
   a second cutting die movable relative to the first cutting die;
   an electric motor;
   a planetary transmission positioned downstream of the electric motor;
   a drivetrain for converting a rotational output of the planetary transmission to a pivoting movement of the second cutting die, wherein the drivetrain includes an arm coupled to the second cutting die, and
   a shaft extending through the arm and defining a pivot axis, wherein the arm is configured to pivot about the pivot axis; and
   a guide coupled to the arm and including a hub portion mounted to the shaft and a lobe portion radially extending from the hub portion, wherein the lobe portion of the guide includes a planar edge that is tangent to the recess in the first cutting die prior to the cutting operation, and wherein a second portion of the threaded rod is engageable with the planar edge to support the threaded rod to be perpendicular relative to the second cutting die prior to the cutting operation and the guide moves away from the second portion of the threaded rod as the cutting operation begins.

* * * * *